US008050152B2

(12) United States Patent
Iijima et al.

(10) Patent No.: US 8,050,152 B2
(45) Date of Patent: Nov. 1, 2011

(54) OPTICAL PICKUP UNIT AND OPTICAL DISC APPARATUS

(75) Inventors: Akira Iijima, Gunma (JP); Takamitsu Touno, Tokyo (JP); Kiyoshi Hibino, Gifu (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/781,555

(22) Filed: May 17, 2010

(65) Prior Publication Data

US 2010/0246370 A1 Sep. 30, 2010

Related U.S. Application Data

(63) Continuation of application No. 11/669,754, filed on Jan. 31, 2007, now Pat. No. 7,746,733.

(30) Foreign Application Priority Data

Feb. 1, 2006 (JP) ................................ 2006-024281
Oct. 16, 2006 (JP) ................................ 2006-281176

(51) Int. Cl.
*G11B 7/00* (2006.01)

(52) U.S. Cl. ................................................... 369/44.14
(58) Field of Classification Search ............... 369/44.14, 369/44.15, 44.21, 44.22, 44.12, 44.37; 526/273; 359/814, 813; 720/683
See application file for complete search history.

(56) References Cited

U.S. PATENT DOCUMENTS

| 6,521,732 | B2 * | 2/2003 | Perez et al. ................... 526/273 |
| 6,785,064 | B2 * | 8/2004 | Nogami ....................... 359/814 |
| 7,032,231 | B2 | 4/2006 | Cheong et al. |
| 7,228,553 | B2 * | 6/2007 | Lee et al. ....................... 720/683 |
| 7,414,927 | B2 * | 8/2008 | Hong et al. ................ 369/44.15 |
| 7,420,891 | B2 | 9/2008 | Ochi et al. |
| 2004/0062183 | A1 | 4/2004 | Cheong et al. |

FOREIGN PATENT DOCUMENTS

| CN | 1485830 A | 3/2004 |
| JP | H5-159332 | 6/1993 |
| JP | 9120573 A | 5/1997 |
| JP | H11-353675 | 12/1999 |
| JP | 2001-184681 | 7/2001 |
| JP | 2003-45054 | 2/2003 |
| JP | 2005-63511 | 3/2005 |

OTHER PUBLICATIONS

Japanese Exam Hiromasa Nakano, Office Action for application No. 2006-281176, dated Oct. 5, 2010, 3 pages.
Chinese Office Action for Application No. 200710007974.2 (with English translation) dated Nov. 20, 2009, 9 pages.
Chinese Office Action in Chinese Patent Application No. 201010128651.0, mailed Mar. 18, 2011, 6 pages.

\* cited by examiner

*Primary Examiner* — Nabil Z Hindi
(74) *Attorney, Agent, or Firm* — Fish & Richardson P.C.

(57) ABSTRACT

An optical pickup unit comprising: an objective lens that focuses laser light on an optical disc; a lens holder that holds the objective lens; a coil that is fitted on the lens holder and capable of driving the lens holder; and a reinforcement member that is fitted on the lens holder and reinforces strength of the lens holder.

21 Claims, 5 Drawing Sheets

OPTICAL PICKUP UNIT AND OPTICAL DISC APPARATUS

CROSS-REFERENCE TO RELATED APPLICATIONS

This is a continuation of application Ser. No. 11/669,754 filed on Jan. 31, 2007, which claims the benefit of priority to Japanese Patent Application Nos. 2006-24281, filed Feb. 1, 2006, and 2006-281176, filed Oct. 16, 2006, of which full contents are incorporated herein by reference.

BACKGROUND OF THE INVENTION

1. Field of the Invention

The present invention relates to an optical pickup unit and an optical disc apparatus, capable of reproducing data recorded on an optical disc and of recording data onto the optical disc.

2. Description of the Related Art

Of late years, proposed is an optical pickup unit not shown, a so-called optical head whose lens holder is mounted with two objective lenses (see, e.g., Japanese Patent Application Laid-open Publication No. 9-120573 (p. 2, FIGS. 1-3).

However, with respect to a conventional optical pickup unit having a lens holder with an objective lens, if the distances are unequal between the coils around the lens holder and the objective lens, it has been feared that heat transfers to the objective lens may become non-uniform when heat is generated in the coils. It is a problem that non-uniform heat transfers to the objective lens may induce uneven temperature gradients in the objective lens. It is feared, in the case of non-uniform heat transfers to the objective lens, that thermal expansions of the objective lens may not become uniform, resulting in occurrence of aberrations on a spot of laser light focused by the objective lens to be applied to the optical disc.

Since the conventional optical pickup unit is of a structure where the objective lens is warmed up gradually from its portions closer to the coils, the objective lens is expected to have large temperature gradients when checking the temperature characteristics of the objective lens. It is difficult for the objective lens with large temperature gradients to have substantially uniform thermal expansions or thermal contractions, as a result of which aberrations may occur on a spot of laser light focused by the objective lens to be applied to the optical disc.

Furthermore, with respect to the conventional optical pickup unit having a lens holder with two objective lenses, occurrence of higher-order resonance has been feared. The higher-order resonance of the optical pickup unit means that the lens holder with lenses is subjected to significant vibrations in frequency regions of about 10 KHz or more for example. In the case of the occurrence of a higher-order resonance in the lens holder with lenses, when the optical disc apparatus having the optical pickup unit makes random access to an optical disc, it is feared that the optical pickup unit may not be able to perform a normal seeking operation to the optical disc due to its runaway. The seek means moving the optical pickup unit to a designated position on the disc. Required is an optical pickup unit capable of preventing the occurrence of runaway.

It is also feared, in the case of the occurrence of a significant higher-order resonance in the lens holder with lenses of the optical pickup unit, that moving members such as the lens holder may be deformed. To suppress the higher-order resonance occurring in the lens holder with lenses of the optical pickup unit, an increase in rigidity of the lens holder, etc., is required.

The optical pickup unit is also facing the needs for a reduction in weight, an improvement in responsivity and a lowering of the price.

SUMMARY OF THE INVENTION

An optical pickup unit according to an aspect of the present invention may comprise: an objective lens that focuses laser light on an optical disc; a lens holder that holds the objective lens; a coil that is fitted on the lens holder and capable of driving the lens holder; and a reinforcement member that is fitted on the lens holder and reinforces strength of the lens holder.

In an optical pickup unit according to an aspect of the present invention, the reinforcement member may be formed from a non-magnetic material.

In an optical pickup unit according to an aspect of the present invention, the lens holder may be formed substantially in a shape of a box having an opening, and the reinforcement member may be formed substantially in a plate shape corresponding to the opening, and a lens holder assembly may be configured such that the reinforcement member is fitted in the opening.

In an optical pickup unit according to an aspect of the present invention, the lens holder may further comprise: a lens fitting portion on which the objective lens is fitted; and a member fitting portion on which the reinforcement member is fitted, and the lens fitting portion and the member fitting portion may be formed at substantially opposite sides of the lens holder, respectively.

In an optical pickup unit according to an aspect of the present invention, the objective lens may further comprise: a first objective lens for a first-wavelength laser light; and a second objective lens for a second-wavelength laser light having a wavelength different from that of the first-wavelength laser light, the lens holder may further comprise: a lens fitting portion on which the first objective lens and the second objective lens are fitted; and a member fitting portion on which the reinforcement member is fitted, and the lens fitting portion and the member fitting portion may be formed at substantially opposite sides of the lens holder, respectively, and a lens assembly may be configured such that the first objective lens and the second objective lens are fitted on the lens fitting portion and such that the reinforcement member is fitted on the member fitting portion.

In an optical pickup unit according to an aspect of the present invention, the reinforcement member may be provided with a lightening portion configured to reduce weight of the reinforcement member.

In an optical pickup unit according to an aspect of the present invention, the reinforcement member is formed with a laser light passing hole that allows the laser light to pass therethrough.

In an optical pickup unit according to an aspect of the present invention, the reinforcement member may be provided with a positioning protrusive end edge and the lens holder may be provided with a positioning bulged inner wall corresponding to the positioning protrusive end edge.

In an optical pickup unit according to an aspect of the present invention, the reinforcement member may abut against a wall which is a constituent of the lens holder.

In an optical pickup unit according to an aspect of the present invention, the lens holder may further comprise: a first piece on which the objective lens is fitted; and a second piece on which the reinforcement member is fitted.

In an optical pickup unit according to an aspect of the present invention, the lens holder may further comprise: a first piece on which the objective lens is fitted; and a second piece on which the reinforcement member is fitted, and a thermal conductivity of a material forming the first piece may be different from that of a material forming the second piece.

In an optical pickup unit according to an aspect of the present invention, the lens holder may further comprise: a first piece on which the objective lens is fitted; and a second piece on which the reinforcement member is fitted, and the coil may further comprise a first-direction driving coil fitted on the first piece; and a second-direction driving coil fitted on the second piece, and the first piece may be provided with a first coil fitting portion around which the first-direction driving coil is wound, and the second piece may be provided with a second coil fitting portion around which the second-direction driving coil is wound.

In an optical pickup unit according to an aspect of the present invention, the reinforcement member may be secured to the lens holder with an adhesive.

In an optical pickup unit according to an aspect of the present invention, the adhesive may include a one-part adhesive.

In an optical pickup unit according to an aspect of the present invention, the adhesive may include an electron beam curable adhesive.

In an optical pickup unit according to an aspect of the present invention, the adhesive may include an adhesive containing a thermoset resin.

In an optical pickup unit according to an aspect of the present invention, the adhesive may include an epoxy resin.

In an optical pickup unit according to an aspect of the present invention, the adhesive may include an acrylic resin.

An optical disc apparatus according to an aspect of the present invention may comprise an optical pickup unit according to an aspect of the present invention.

According to the present invention, the occurrence is prevented of such deficiency that the lens holder provided with the objective lens may significantly vibrate resulting in a deformation of the lens holder. By the reinforcement member that reinforces the strength of the lens holder, the vibrations occurring in the lens holder are suppressed. Thus, the optical pickup unit allowing for vibrations is configured.

According to the present invention, the occurrence is prevented of such deficiency that malfunctions of the optical disc apparatus may occur.

The other features of the present invention will become apparent from the following description of this specification and the accompanying drawings.

BRIEF DESCRIPTION OF THE DRAWINGS

For more thorough understanding of the present invention, the following description should be read in conjunction with the accompanying drawings, in which.

DETAILED DESCRIPTION OF THE INVENTION

Figure 1:
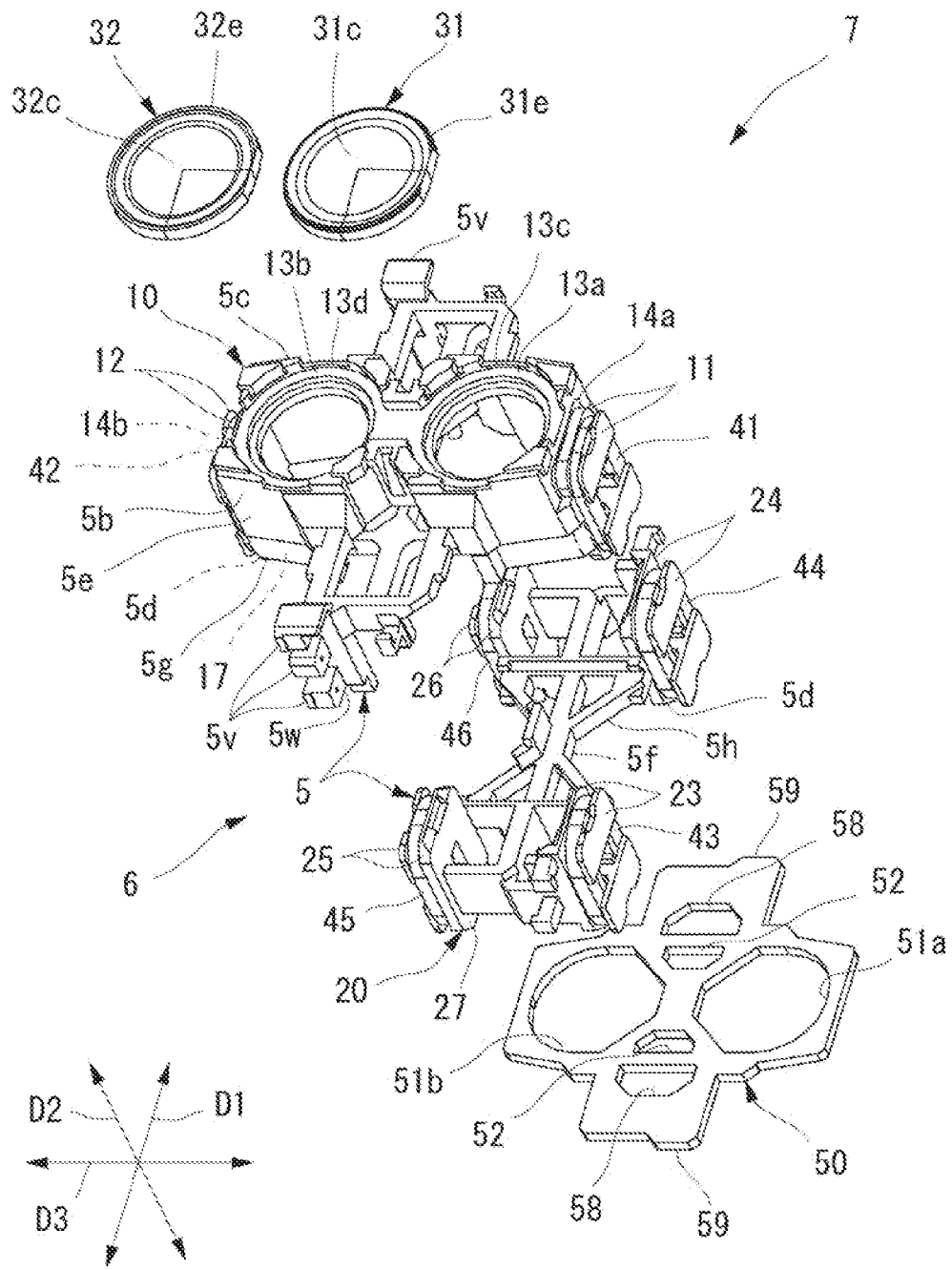
FIG. 1 is an exploded perspective view of an embodiment of a lens assembly of an optical pickup unit according to the present invention.
Figure 2:
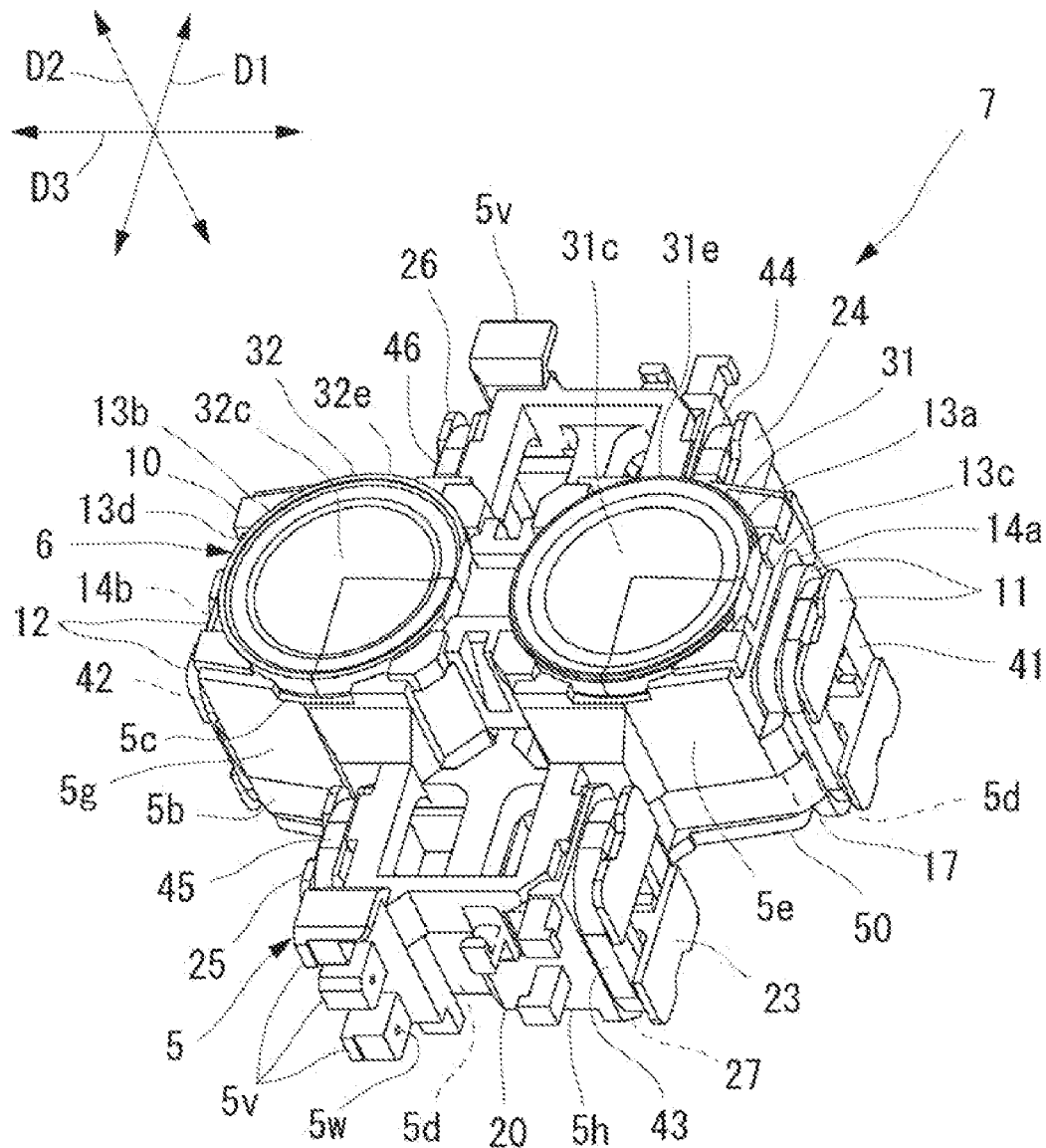
FIG. 2 is a perspective view of the top side of the lens assembly making up the optical pickup unit.
Figure 3:
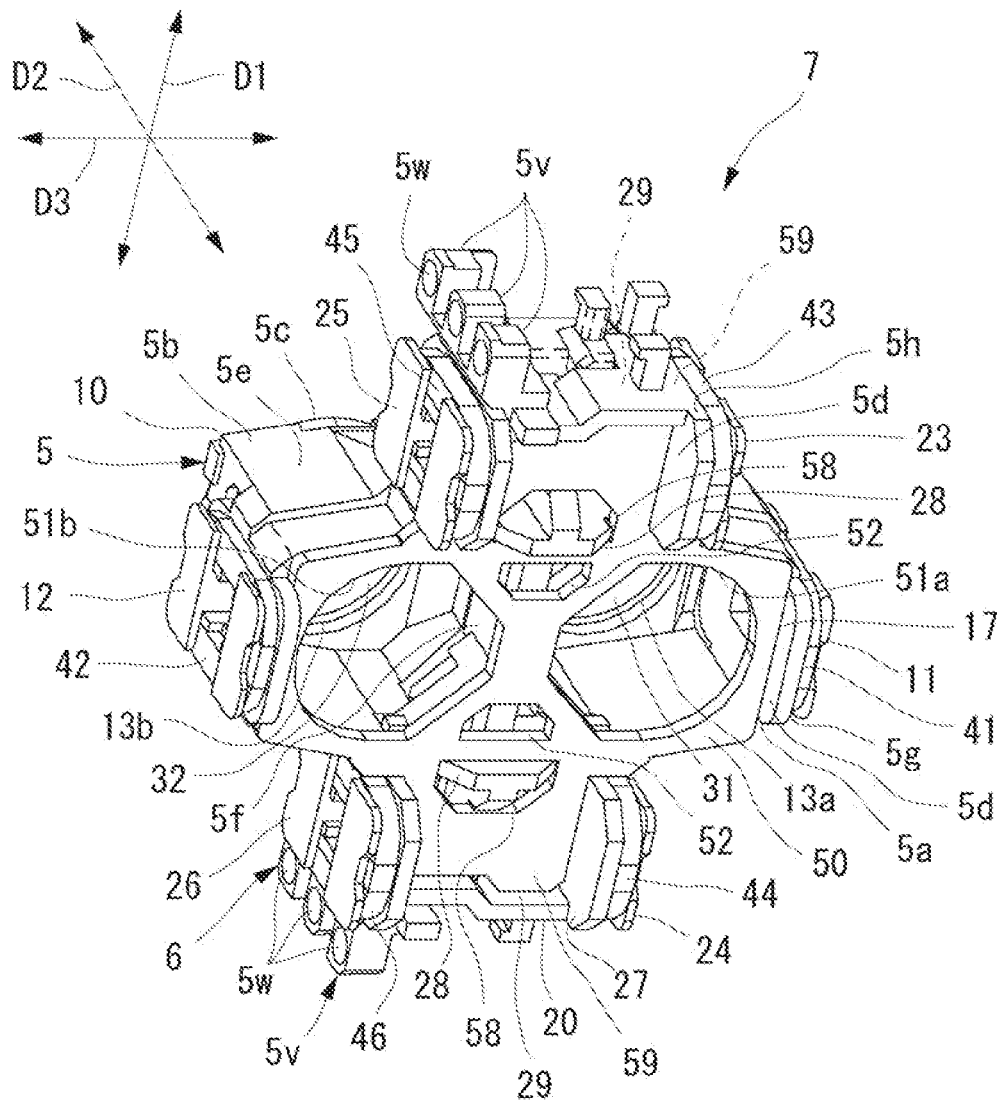
FIG. 3 is a perspective view of the bottom side of the lens assembly making up the optical pickup unit.
Figure 4:
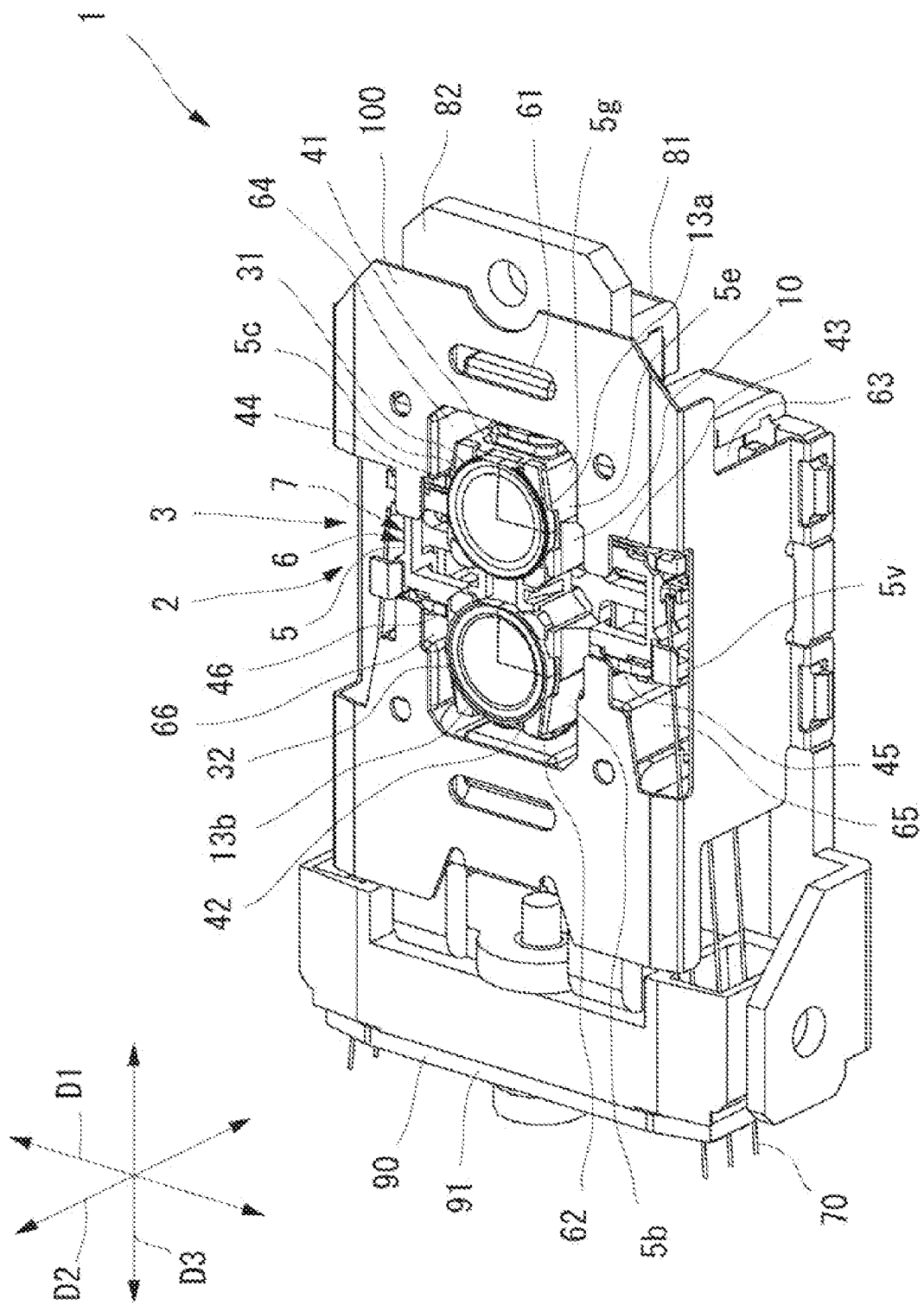
FIG. 4 is a perspective view of the top side of the optical pickup unit.
Figure 5:
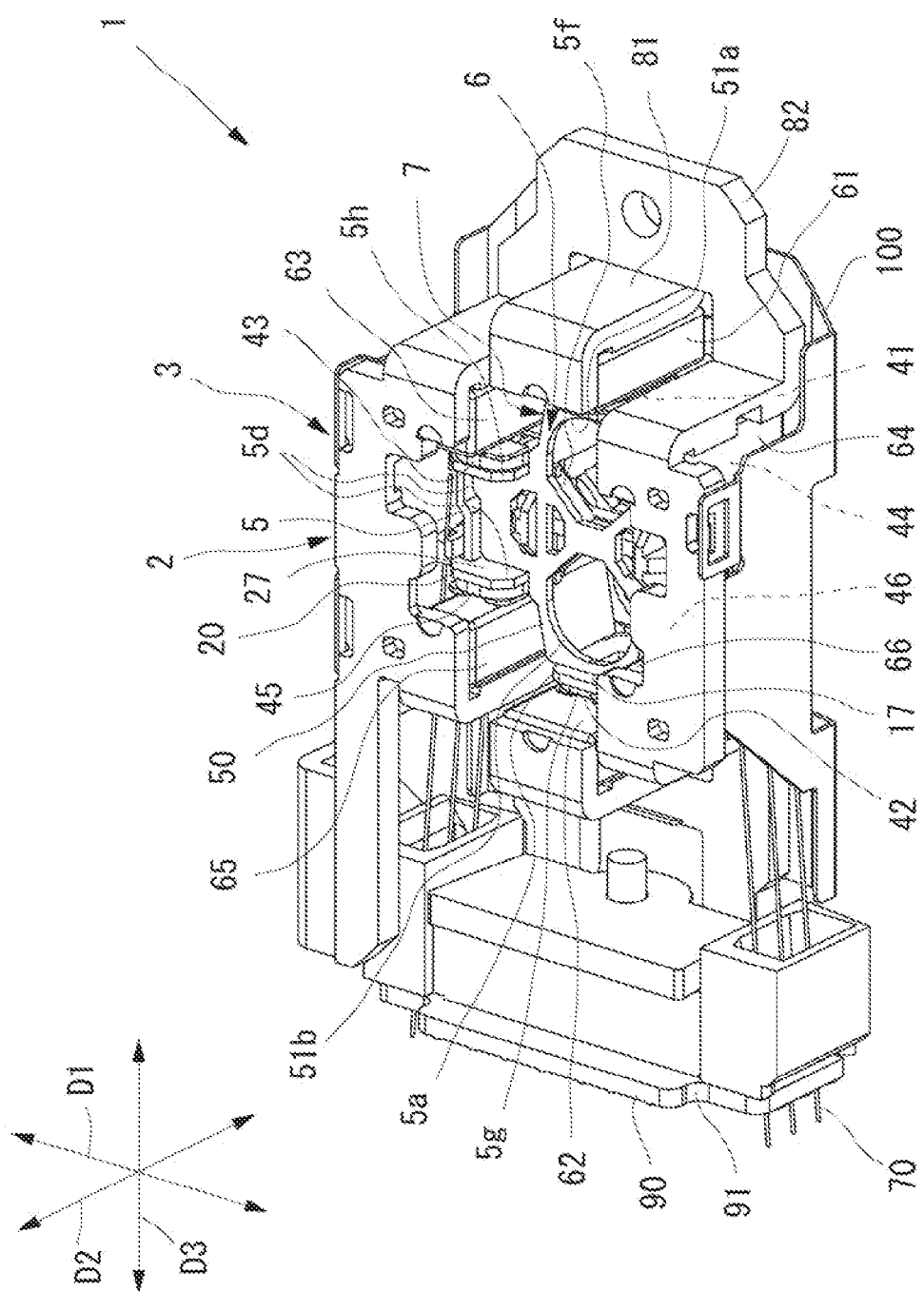
FIG. 5 is a perspective view of the bottom side of the optical pickup unit.

FIG. 1 is an exploded perspective view of an embodiment of a lens assembly of an optical pickup unit according to the present invention; FIG. 2 is a perspective view of the top side of the lens assembly making up the optical pickup unit; FIG. 3 is a perspective view of the bottom side of the lens assembly making up the optical pickup unit; FIG. 4 is a perspective view of the top side of the optical pickup unit; and FIG. 5 is a perspective view of the bottom side of the optical pickup unit.

Directions will be described. The side of a lens holder 5 (FIGS. 1, 2, and 4) on which objective lenses 31 and 32 are fitted refers to the top side of the lens holder 5, or the top side of a lens holder assembly 6, or the top side of a lens assembly 7, or the top side of an optical pickup unit 1. The side of the lens holder (FIGS. 1, 3, and 5) on which a heat transfer improving member 50 for reinforcement is fitted refers to the bottom side of the lens holder 5, or the bottom side of the lens holder assembly 6, or the bottom side of the lens assembly 7, or the bottom side of the optical pickup unit 1.

The direction from a coil 43 (FIGS. 1 to 4) toward a coil 44 or the direction from the coil 44 toward the coil 43, or the direction from a coil 45 toward a coil 46 or the direction from the coil 46 toward the coil 45 refers to the front-to-rear direction D1 of the lens holder 5, or the front-to-rear direction D1 of the lens holder assembly 6, or the front-to-rear direction D1 of the lens assembly 7, or the front-to-rear direction D1 of the optical pickup unit 1. As used herein, the front-to-rear direction D1 is defined as a first direction D1.

The direction from the objective lenses 31 and 32 (FIGS. 1 to 3) toward the heat transfer improving member 50 for reinforcement or the direction from the heat transfer improving member 50 for reinforcement toward the objective lenses 31 and 32 refers to the top-to-bottom direction D2 of the lens holder 5, or the top-to-bottom direction D2 of the lens holder assembly 6, or the top-to-bottom direction D2 of the lens assembly 7, or the top-to-bottom direction D2 of the optical pickup unit 1. As used herein, the top-to-bottom direction D2 is defined as a second direction D2.

The direction from a coil 41 (FIGS. 1 to 45) toward a coil 42 or the direction from the coil 42 toward the coil 41, refers to the left-to-right direction D3 of the lens holder 5, or the left-to-right direction D3 of the lens holder assembly 6, or the left-to-right direction D3 of the lens assembly 7, or the left-to-right direction D3 of the optical pickup unit 1. As used herein, the left-to-right direction D3 is defined as a third direction D3.

The definitions of the "front", "rear", "top", "bottom", "left", and "right" used herein are merely given for convenience' sake to describe the optical pickup unit 1 and an optical disc apparatus not shown.

Optical pickup is generally abbreviated to "OPU". The optical pickup unit may also be abbreviated to "OPU". As used herein, the OPU is the abbreviation of the optical pickup unit for the sake of convenience.

The objective lens is abbreviated to "OBL". The OBLs 31 and 32 serve to focus laser light emitted from corresponding light emitting elements not shown onto a signal portion of an optical disc. The OBLs 31 and 32 are formed of a substantially colorless, transparent glass material. For example, a substantially colorless, transparent synthetic resin material is used, and the OBLs 31 and 32 may be formed based on injection molding superior in mass production capabilities.

The OPU 1 (FIGS. 4 and 5) housed in the optical disc apparatus is used to reproduce or record data such as information from or on the optical disc not shown. The optical disc can be e.g., a CD-type optical disc and a DVD-type optical disc (both not shown). "CD" is the abbreviation of "Compact Disc" (trademark). "DVD" is the abbreviation of "Digital Versatile Disc" (registered trademark).

The optical disc will be described in detail. The optical disc can be, e.g., data read-only optical discs such as "CD-ROM" and "DVD-ROM", data recordable optical discs such as "CD-R", "DVD-R", and "DVD+R", and optical discs capable of data writing/erasing and data rewriting such as "CD-RW", "DVD-RW", "DVD+RW" (registered trademark), "DVD-RAM", "HD DVD" (registered trademark), and "Blu-ray Disc" (registered trademark).

"ROM" of "CD-ROM" or "DVD-ROM" is the abbreviation of "Read Only Memory". "CD-ROM" or "DVD-ROM" is a disc dedicated to reading of data/information therefrom. "R" of "CD-R", "DVD-R", or "DVD+R" is the abbreviation of "Recordable". "CD-R", "DVD-R", or "DVD+R" is a disc enabling writing of data/information thereon. "RW" of "CD-RW", "DVD-RW", or "DVD+RW" is the abbreviation of "Re-Writable". "CD-RW", "DVD-RW", or "DVD+RW" is a disc enabling rewriting of data/information thereon. "DVD-RAM" is the abbreviation of "Digital Versatile Disc Random Access Memory". "DVD-RAM" is a disc enabling writing/reading and erasing of data/information.

"HD DVD" is the abbreviation of "High Definition DVD". "HD DVD" is a disc compatible with a conventional DVD-type disc having a larger storage capacity than the conventional DVD-type disc. Infrared laser is used for the conventional CD. Red laser is used for the conventional DVD. However, blue-violet laser is used when reading data/information recorded on the optical disc in the form of "HD DVD". "Blu-ray" means blue-violet laser employed to achieve high density recording, as against red laser used for conventional reading/writing of signals.

The optical disc may be e.g., an optical disc not shown whose both disc sides have respective signal surfaces to enable data writing/erasing and data rewriting. The optical disc may be e.g., an optical disc not shown having two-layered signal surfaces to enable data writing/erasing and data rewriting. The optical disc may be e.g., an optical disc not shown for "HD-DVD" having three-layered signal surfaces to enable data writing/erasing and data rewriting. The optical disc may be e.g., an optical disc not shown for "Blu-ray Disc" having four-layered signal surfaces to enable data writing/erasing and data rewriting. The optical disc may be e.g., an optical disc not shown having a labeled side to which laser light is applied to enable various writing on the label, etc.

The OPU 1 is used when reproducing data recorded on the various optical discs or recording data on the various writable or rewritable optical discs. The OPU 1 supports the CD-type optical disc, the DVD-type optical disc, etc. This OPU 1 is configured to be able to support plural different types of optical discs.

The OPU 1 (FIGS. 4 and 5) includes a couple of OBLs 31 and 32 (FIGS. 1 to 3) each focusing laser light on a signal surface not shown of an optical disc of Blu-ray Disc type, DVD type, CD type, etc.; a lens holder 5 holding the OBLs 31 and 32; a plurality of coils 41, 42, 43, 44, 45, and 46 fitted on the lens holder 5, capable of driving the lens holder 5; and a heat transfer improving member 50 fitted on the lens holder 5, allowing heat generated in the coils 41, 42, 43, 44, 45, and 46 when the coils 41, 42, 43, 44, 45, and 46 are energized as a result of current flowing through the coils 41, 42, 43, 44, 45, and 46 to be radiated while allowing the heat to be transferred substantially uniformly to the OBLs 31 and 32 via the lens holder 5.

By fitting the OPU 1 with the heat transfer improving member 50, thermal effects on the OBLs 31 and 32 are suppressed. By fitting the lens holder 5 with the heat transfer improving member 50, the heat is effectively radiated that is generated in the coils 41, 42, 43, 44, 45, and 46 when the coils 41, 42, 43, 44, 45, and 46 are energized as a result of current flowing through the coils 41, 42, 43, 44, 45, and 46. By fitting the lens holder 5 with the heat transfer improving member 50, the heat is substantially uniformly transferred with ease via the lens holder 5 to the OBLs 31 and 32 that is generated in the coils 41, 42, 43, 44, 45, and 46 when the coils 41, 42, 43, 44, 45, and 46 are energized as a result of current flowing through the coils 41, 42, 43, 44, 45, and 46. The occurrence of the deficiency is thus prevented that the OBLs 31 and 32 may not expand substantially uniformly when the coils 41, 42, 43, 44, 45, and 46 are energized, whereupon aberrations may occur on a spot of laser light focused by the OBLs 31 and 32 to be applied to the optical disc.

When current flow through the coils 41, 42, 43, 44, 45, and 46, the whole lens holder 5 is warmed up substantially evenly to raise the temperature of the lens holder 5. Accordingly, the temperature of lens peripheral portions 31e and 32e, respectively, become substantially equal to the temperature of substantially central portions 31c and 32c of the OBLs 31 and 32, respectively. It is thus prevented that the thermal expansions of the OBLs 31 and 32 may cause the aberrations on the spot of laser light focused by the OBLs 31 and 32 to be applied to the optical disc.

A driving part 2 (FIGS. 4 and 5) of the OPU 1 is configured to include, e.g., the plurality of coils 41, 42, 43, 44, 45, and 46 that generate electromagnetic forces when energized as a result of current flowing therethrough; a plurality of magnets 61, 62, 63, 64, 65, and 66 corresponding to the plurality of coils 41, 42, 43, 44, 45, and 46, respectively, to generate magnetic forces at all times; a first yoke 81 (FIG. 5) fitted with the magnets 61 and 62; a second yoke 82 fitted with the magnets 63, 64, 65, and 66; the first OBL 31 which is positioned in the vicinity of the coil 41 (FIG. 4) and through which laser light passes; the second OBL 32 which is positioned in the vicinity of the coil 42 and through which laser light passes; the heat transfer improving member 50 (FIG. 5) to suppress the thermal effects on the couple of OBLs 31 and 32; the lens holder 5 (FIGS. 1 to 5) fitted with the plurality of coils 41, 42, 43, 44, 45, and 46 (FIG. 4), the couple of OBLs 31 and 32, and the heat transfer improving member 50; and a plurality of suspensions 70 (FIGS. 4 and 5) resiliently supporting the lens holder 5.

"Yoke" means a member structurally supporting the magnetic connection for example. The yoke serves to reduce the leak of magnetic forces arising from the magnets. The driving part 2 of the OPU 1 is configured as a so-called actuator 2. "Actuator" means e.g., a driving device converting energy into a translational motion or a rotational motion. The actuator is abbreviated to "ACT". When a focal point of laser light focused by the OBLs 31 and 32 is adjusted to be on a signal surface layer, the lens assembly 7 fitted with the OBLs 31 and 32 is moved back and forth and up and down by the actuator 2.

Corresponding to the first-direction driving coil 41 (FIG. 5), the first-direction driving magnet 61 is fixedly fitted on the first yoke 81. Corresponding to the first-direction driving coil 42, the first-direction driving magnet 62 is fixedly fitted on the first yoke 81. Corresponding to the second-direction driving coil 43, the second-direction driving magnet 63 is fixedly fitted on the second yoke 82. Corresponding to the second-direction driving coil 44 (FIG. 4), the second-direction driving magnet 64 is fixedly fitted on the second yoke 82. Corresponding to the second-direction driving coil 45 (FIGS. 4 and 5), the second-direction driving magnet 65 is fixedly fitted on the second yoke 82. Corresponding to the second-direction driving coil 46 (FIG. 4), the second-direction driving magnet 66 is fixedly fitted on the second yoke 82.

The coils 41, 42, 43, 44, 45, and 46 are formed by winding a thin linear conductor around coil fitting portions 11, 12, 23, 24, 25, and 26 by means of a jig not shown for example. A thin enamel-coated electric wire for example was used as the conductor. The coils 41, 42, 43, 44, 45, and 46 of two-layer winding type for example are formed by performing the winding work of the thin linear conductor coated with enamel. Depending on the design/specifications of the OPU 1, coils not shown of other forms may be used in place of the coils 41, 42, 43, 44, 45, and 46 shown in FIGS. 1 to 5. Single-layer wound coils (41, 42, 43, 44, 45, and 46) may be used as the coils 41, 42, 43, 44, 45, and 46. The coils (41, 42, 43, 44, 45, and 46) may be e.g., coils not shown formed by plating a circuit conductor on a substrate having a glass layer portion and a resin layer portion such as an epoxy resin layer. For example, a printed coil may be used as the coil.

As used herein, parentheses ( ) imparted to the reference numerals are used for convenience's sake to describe constituent elements of slightly different shapes from those shown.

The lens holder 5 fitted with the OBLs 31 and 32, the coils 41, 42, 43, 44, 45, and 46, and the heat transfer improving member 50 is resiliently supported by the plurality of suspensions wires 70 (FIGS. 4 and 5) in a movable manner. The metal suspension wires 70 are electrically connectably fitted on a control board 90, i.e., a so-called circuit board 90 provided with a circuit conductor.

Used as the suspension wires 70 is an electric wire in the form of a thin conductor superior in a resiliently supporting performance. The metal suspensions wires 70 are inserted into wire attachment holes 5w of wire fitting portions 5v projecting from the first piece 10 of the lens holder 5 (FIGS. 1 to 3) and are soldered to one ends of the coils 41, 42, 43, 44, 45, and 46 to be fitted on the lens holder 5. At that time, while the suspension wires 70 are inserted in the wire attachment holes 5w of a pair of the wire fitting portions 5v, 5v, an adhesive such as an electron beam curable adhesive is applied to the wire attachment holes 5w so that the adhesive such as the electron beam curable adhesive cures to fix the suspension wires 70 to the lens holder 5. The adhesive used is e.g., an adhesive of the same type as the adhesive for fixing the first OBL 31 and the second OBL 32 to the first piece 10 making up the lens holder 5 (FIGS. 1 and 2). The lens holder 5 fitted with the OBLs 31 and 32 are resiliently supported by the plurality of metal suspension wires 70 (FIGS. 4 and 5) in a movable manner.

A board body 91 of the circuit board 90 is formed from a synthetic resin material having excellent insulating properties. For example, a metal circuit conductor is formed on the board body 91 of the synthetic resin, on top of which an insulating film is disposed to make up the circuit board 90 (all not shown). The circuit board is called e.g., a PWB (printed wired board/printed wiring board).

A moving part 3 (FIGS. 4 and 5) of the OPU 1 is configured to include e.g., the six coils 41, 42, 43, 44, 45, and 46 generating electromagnetic forces when energized as a result of current flowing therethrough; the first OBL 31 which is positioned in the vicinity of the coil 41 (FIG. 4) and through which laser light passes; the second OBL 32 which is positioned in the vicinity of the coil 42 and through which laser light passes; the heat transfer improving member 50 (FIG. 5) suppressing the thermal effects on the couple of OBLs 31 and 32; the lens holder 5 (FIGS. 1 to 5) fitted with the six coils 41, 42, 43, 44, 45, and 46 (FIG. 4), and the couple of OBLs 31 and 32, and the heat transfer improving member 50; and the six suspension wires 70 (FIGS. 4 and 5) resiliently supporting the lens holder 5.

The circuit board 90 and the suspension wires 70 are electrically connected, and the suspension wires 70 and the coils 41, 42, 43, 44, 45, and 46 are electrically connected, so that current flows from the circuit board 90 via the suspension wires 70 to the coils 41, 42, 43, 44, 45, and 46 to move the lens holder 5 fitted with the coils 41, 42, 43, 44, 45, and 46, the objective lenses 31 and 32, and the heat transfer improving member 50.

The heat transfer improving reinforcement member 50 is formed with a pair of laser light passing holes 51a and 51b (FIGS. 1, 3, and 5) allowing laser light to pass therethrough. The laser light passing holes 51a and 51b formed on the heat transfer improving reinforcement member 50 serves also as a lightening part for reducing the weight of the heat transfer improving reinforcement member 50.

The heat transfer improving member 50 (FIGS. 1 to 3) serves also as the reinforcement member 50 for reinforcing the rigidity and strength of the lens holder 5.

This prevents the occurrence of the deficiency that the lens holder 5 fitted with the couple of OBLs 31 and 32 vibrates significantly to cause the plastic deformation of the lens holder 5 upon seeking of the OPU 1 for example. By allowing the heat transfer improving member 50 to serve also as the reinforcement member 50 reinforcing the rigidity and the strength of the lens holder 5, the vibrations occurring in the lens holder 5 are suppressed. Thus, the OPU 1 allowing for the vibrations is configured.

As shown in FIGS. 3 and 5, the lens holder 5 is in the shape of a substantially rectangular box having a bottom opening 5a. The heat transfer improving reinforcement member 50 (FIGS. 1 and 3) is in the shape of a substantially flat plate (FIG. 1) corresponding to the bottom opening 5a (FIG. 3) of the lens holder 5. The heat transfer improving reinforcement member 50 is fitted in the bottom opening 5a (FIG. 3) of the lens holder 5 to make up the lens holder assembly 6.

This improves the rigidity of the lens holder assembly 6 provided with the substantially rectangular box-shaped lens holder 5. By fitting the substantially flat plate-shaped heat transfer improving reinforcement member 50 in the bottom opening 5a of the substantially rectangular box-shaped lens holder 5, the heat transfer improving reinforcement member 50 functions as e.g., a substantially flat plate-shaped lid for the substantially rectangular box-shaped lens holder 5. For example, when comparing a strength between a box-shaped object with its lid opened and a box-shaped object with its lid closed, the box-shaped object with its lid closed is stronger than the box-shaped object with its lid opened. Based on this, by fitting the substantially flat plate-shaped heat transfer improving reinforcement member 50 in the bottom opening 5a of the substantially rectangular box-shaped lens holder 5, improvements are achieved in the rigidity and strength of the lens holder assembly 6 including the lens holder 5 and the heat transfer improving reinforcement member 50. The improved rigidity of the lens holder assembly 6 prevents the occurrence of higher-order resonance in which the lens holder 5 provided with the plurality of objective lenses 31 and 32 vibrates significantly when the OPU 1 seeks for example. Thus, the OPU 1 is configured that allows for the higher-order resonance and that is easy to control.

As used herein, the higher-order resonance means the state where the moving part 3 making up the OPU 1 resonates to such an extent that it deforms.

The lens holder 5 (FIGS. 1 and 2) making up the lens holder assembly 6 includes lens fitting portions 13a and 13b fitted with the OBLs 31 and 32 and member fitting portions 17 and 27 (FIG. 3) fitted with the heat transfer improving reinforcement member 50. The member fitting portions 17 and 27 (FIG. 3) are formed at one side of the lens holder 5, which is substantially opposite to the lens fitting portions 13a and 13b (FIG. 1) formed at the other side of the lens holder 5. The lens fitting portions 13a and 13b are formed on the top side of the lens holder 5 (FIGS. 1 and 2), while the member fitting portions 17 and 27 are formed on the bottom side of the lens holder 5 (FIG. 3). The OBLs 31 and 32 making up the lens assembly 7 (FIG. 1) are fitted on an upper portion 5c of the lens holder 5, whereas the heat transfer improving reinforcement member 50 (FIG. 3) is fitted on a lower portion 5d of the lens holder 5 substantially opposite to the upper portion 5c of the lens holder 5.

By configuring the lens assembly 7 in this manner, the thermal effects on the OBLs 31 and 32 are suppressed. Since in the lens holder 5, the heat transfer improving reinforcement member 50 is fitted on the member fitting portions 17 and 27 substantially opposite to the lens fitting portions 13a and 13b fitted with the OBLs 31 and 32, heat transferred to the OBLs 31 and 32 becomes substantially uniform and the temperature gradients in the OBLs 31 and 32 become decreased. Most of heat generated from the coils 41, 42, 43, 44, 45, and 46 mounted on the lens holder 5 is transferred to the heat transfer improving reinforcement member 50 fitted on the member fitting portions 17 and 27 of the lens holder 5, to be radiated therefrom. In the lens holder 5, since the OBLs 31 and 32 are fitted on the lens fitting portions 13a and 13b substantially opposite to the member fitting portions 17 and 27 fitted with the heat transfer improving reinforcement member 50, part of heat is transferred to the OBLs 31 and 32 fitted on the lens fitting portions 13a and 13b of the lens holder 5.

The thus configured OPU 1 suppresses the "temperature unevenness" which may occur in the OBLs 31 and 32. Due to having suppressed "temperature unevenness" in the OBLs 31 and 32, the OBLs 31 and 32 thermally expand substantially uniformly. The substantially uniform thermal expansions of the OBLs 31 and 32 prevent aberrations from occurring on a spot of laser light focused by the OBLs 31 and 32 to be applied to an optical disc. Thus, the OPU 1 is configured in which the aberrations hardly occur and that is easy to control.

There are used, as the OBLs 31 and 32 (FIG. 1), two different types of OBLs 31 and 32, i.e., the first OBL 31 for a first-wavelength laser light, and the second OBL 32 for a second-wavelength laser light having a wavelength different from that of the first-wavelength laser light.

The lens holder 5 (FIGS. 1 and 2) includes the first lens fitting portion 13a fitted with the first OBL 31, the second lens fitting portion 13b fitted with the second OBL 32, and the member fitting portions 17 and 27 (FIG. 3) fitted with the heat transfer improving reinforcement member 50. The member fitting portions 17 and 27 are formed at one side of the lens holder 50, which is substantially opposite to the first lens fitting portion 13a and the second lens fitting portion 13b formed at the other side of the lens holder 5.

The first OBL 31 and the second OBL 32 are fitted on the lens fitting portions 13a and 13b (FIG. 1) of the lens holder 5, and the heat transfer improving reinforcement member 50 is fitted on the member fitting portions 17 and 27 of the lens holder 5, to make up the lens assembly 7 (FIGS. 2 and 3).

This allows a well-balanced lens assembly 7 taking heat measures to be made up. The lens assembly 7 of the OPU 1 is configured to include the plurality of coils 41, 42, 43, 44, 45, and 46 that generate electromagnetic forces when energized as a result of current flowing therethrough; the first OBL 31 which is positioned in the vicinity of the coil 41 and through which the first-wavelength laser light passes; the second OBL 32 which is positioned in the vicinity of the coil 42 and through which the second-wavelength laser light passes; the heat transfer improving reinforcement member 50 suppressing the thermal effects on the couple of OBLs 31 and 32; and the lens holder 5 fitted with the plurality of coils 41, 42, 43, 44, 45, and 46, the couple of OBLs 31 and 32, and the heat transfer improving reinforcement member 50.

Due to the first OBL 31 and the second OBL 32 fitted on the lens fitting portions 13a and 13b disposed on the top side of the lens holder 5, the weight of the side of the lens fitting portions 13a and 13b toward the top of the lens holder 5 increases. However, the heat transfer improving reinforcement member 50 is fitted on the member fitting portions 17 and 27, that are at the bottom side of the lens holder 5, and that are at one side of the lens holder 5, which is opposite to the lens fitting portions 13a and 13b at the other side of the lens holder 5. Therefore, the weight of the side of the member fitting portions 17 and 27 at the bottom of the lens holder 5 is increased, and thereby the balance of the lens assembly 7 as a whole is kept. The heat transfer improving reinforcement member 50 acts as a balancer. Since the balance of the whole lens assembly 7 fitted with the plurality of OBLs 31 and 32 is kept by mounting the lens assembly 7 with the heat transfer improving reinforcement member 50, the occurrence is easily prevented of the deficiency that the OPU 1 fitted with the lens assembly 7 may suffer from the runaway upon seeking of the OPU 1 for example.

In the case of the lens holder 5 fitted with the couple of OBLs 31 and 32, i.e., the first OBL 31 and the second OBL 32, yawing occurs easily when the lens holder 5 is driven. By fitting the lens holder 5 with the heat transfer improving member 50 acting also as the reinforcement member 50, yawing occurring in the lens holder 5 is suppressed.

For example, the electron beam curable adhesive not shown that cures by irradiating with electron beams was used as an adhesive fixing the first OBL 31 and the second OBL 32 to the first piece 10 making up the lens holder 5 (FIGS. 1 and 2). Otherwise, for example, an ultraviolet curable adhesive that cures by irradiating with ultraviolet rays was used as the adhesive.

The first OBL 31 is fitted on the first lens fitting portion 13a of the first piece 10 making up the lens holder 5, and the electron beam curable adhesive is applied to a peripheral portion 13c of the first lens fitting portion 13a through a peripheral portion 31e of the first OBL 31, and the electron beams are applied to the electron beam curable adhesive, whereby the first OBL 31 is fixed to the first lens fitting portion 13a in a short period of time. Otherwise, the first OBL 31 is fitted on the first lens fitting portion 13a of the first piece 10 making up the lens holder 5, and the ultraviolet curable adhesive is applied to a peripheral portion 13c of the first lens fitting portion 13a through a peripheral portion 31e of the first OBL 31, and the ultraviolet rays are applied to the ultraviolet curable adhesive, whereby the first OBL 31 is fixed to the first lens fitting portion 13a in a short period of time.

The second OBL 32 is fitted on the second lens fitting portion 13b of the first piece 10 making up the lens holder 5, and the electron beam curable adhesive is applied to a peripheral portion 13d of the second lens fitting portion 13b through a peripheral portion 32e of the second OBL 32, and the electron beams are applied to the electron beam curable adhesive, whereby the second OBL 32 is fixed to the second lens fitting portion 13b in a short period of time. Otherwise, the second OBL 32 is fitted on the second lens fitting portion 13b of the first piece 10 making up the lens holder 5, and the ultraviolet curable adhesive is applied to a peripheral portion 13d of the second lens fitting portion 13b through a peripheral portion 32e of the second OBL 32, and the ultraviolet rays are applied to the ultraviolet curable adhesive, whereby the second OBL 32 is fixed to the second lens fitting portion 13b in a short period of time.

This allows the first OBL 31 and the second OBL 32 to accurately and promptly be fixed to the first piece 10 making up the lens holder 5. Since the first OBL 31 is fixed with high accuracy to the first lens fitting portion 13a of the first piece 10 making up the lens holder 5, laser light is applied with high accuracy to the signal surface portion of the optical disc. Since the second OBL 32 is fixed with high accuracy to the second fitting portion 13b of the first piece 10 making up the lens holder 5, laser light is applied with high accuracy to the signal surface portion of the optical disc. Since the first OBL 31 and the second OBL 32 are fixed promptly to the first piece 10 making up the lens holder 5, prompt work is ensured of adhesion of the first OBL 31 and the second OBL 32 to the first piece 10 making up the lens holder 5. Thus, the adhesion step in the assembly process of the OPU 1 is speeded up. This leads to a reduction in the price of the OPU 1.

The ultraviolet curable adhesive as one type of the electron beam curable adhesive can be, e.g., an adhesive of OPTO-CAST (trade name) series manufactured by EMI Ltd, USA. A specific ultraviolet curable adhesive can be OPTO-CAST3400, OPTOCAST 3415, etc., manufactured by EMI Ltd., USA. The ultraviolet curable adhesive such as OPTO-CAST3400, OPTOCAST3415, etc., is an epoxy adhesive and is a one-part ultraviolet curable adhesive. The epoxy ultraviolet curable adhesive is of low contraction properties and high heatproof properties and is superior in chemical resistance and humidity resistance. Use of the one-part ultraviolet curable adhesive eliminates the necessity of a work of mixing two different types of liquids performed when a two-part ultraviolet curable adhesive is used. Thus, the adhesive applying step becomes prompt and effective.

The ultraviolet curable adhesive as one type of the electron beam curable adhesive can be, e.g., optical UV adhesives NOA60, NOA83H, etc., manufactured by Norland Products Inc, USA. The ultraviolet curable adhesive such as the optical UV adhesives NOA60, NOA83H, etc., is an acryl adhesive and is a one-part ultraviolet curable adhesive. The acryl ultraviolet curable adhesive is of a short curing time and is curable within several seconds. "UV" means "ultraviolet". "Ultraviolet radiation" means "ultraviolet rays". The ultraviolet curable adhesive is called an UV curable adhesive, etc. Depending on the design specifications of the optical pickup unit, the adhesion step may be performed using e.g., a two-part ultraviolet curable adhesive. The two-part ultraviolet curable adhesive can be e.g., a two-part epoxy ultraviolet curable adhesive.

This OPU 1 is an OPU 1 handling three different wavelengths of the first-wavelength laser light, the second-wavelength laser light whose wavelength is different from that of the first-wavelength laser light, and third-wavelength laser light whose wavelength is different from those of the first-wavelength laser light and the second-wavelength laser light. The first-wavelength laser light is e.g., blue-violet laser light for "HD-DVD" and "Blu-ray Disc" having a wavelength of about 390 nm (nanometers) to 420 nm with its reference wavelength of substantially 405 nm. The second-wavelength laser light is e.g., red laser light for "DVD" having a wavelength of about 630 nm to 685 nm with its reference wavelength of substantially 635 nm or 650 nm. The third-wavelength laser light is e.g., infrared laser light for "CD" having a wavelength of about 770 nm to 830 nm with its reference wavelength of substantially 780 nm.

For example, the first OBL 31 for the first-wavelength laser light to serve "Blu-ray Disc" only. The first OBL 31 has a numerical aperture of substantially 0.85. The numerical aperture refers to the product of the refractive index of a medium in front of the OBL and the sign of the angle at which the effective radius (the radius of entrance pupil) of the OBL is viewed from an object point by an optical instrument. The numerical aperture is used to represent the performances of the OBL. The numerical aperture is abbreviated to "NA".

For example, the second OBL 32 for three different types of laser lights, i.e., the first-wavelength laser light for "HD DVD", the second-wavelength laser light for "DVD", and the third-wavelength laser light for "CD". The second OBL 32 has the numerical aperture of substantially 0.6. A broadband quarter-wave plate with aperture limit not shown is disposed on an optical path of laser light passing through the second OBL 32. By virtue of the disposition of the broadband quarter-wave plate with aperture limit, the second OBL 32 functions as e.g., one having the numerical aperture of about 0.37 to 0.95, substantially 0.45 to 0.65.

As shown in FIG. 1, the first lens fitting portion 13a fitted with the first OBL 31 is concavely formed on the upper portion 5c of a body 5b of the lens holder 5. The second lens fitting portion 13b fitted with the second OBL 32 is concavely formed on the upper portion 5c of a body 5b of the lens holder 5.

The coil fitting portion 11 fitted with the coil 41 is convexly formed from a side surface portion 5e of the body 5b of the lens holder 5 toward the outside of the body 5b. The coil fitting portion 12 fitted with the coil 42 is convexly formed from the side surface portion 5e of the body 5b of the lens holder 5 toward the outside of the body 5b.

The coil fitting portion 23 fitted with the coil 43 is convexly formed from a frame portion 5f making up the holder 5 toward the outside of the frame portion 5f. The coil fitting portion 24 fitted with the coil 44 is convexly formed from a frame portion 5f making up the holder 5 toward the outside of the frame portion 5f. The coil fitting portion 25 fitted with the coil 45 is convexly formed from the frame portion 5f making up the holder 5 toward the outside of the frame portion 5f. The coil fitting portion 26 fitted with the coil 46 is convexly formed from the frame portion 5f making up the holder 5 toward the outside of the frame portion 5f.

Between the first lens fitting portion 13a and the coil fitting portion 11 is disposed a first heat transfer cutoff aperture 14a that prevents heat generated in the coil 41 from being transferred to the first OBL 31. The heat dissipating gap 14a lies between the body 5b of the lens holder 5 and the coil fitting portion 11. The heat transfer cutoff aperture 14a is disposed in the lens holder 5 to cut off a path of heat.

This facilitates the prevention of the transfer of heat generated in the coil 41 (FIGS. 1 and 2) to the first OBL 31. By virtue of the first heat transfer cutoff aperture 14a disposed between the first lens fitting portion 13a of the lens holder 5 and the coil fitting portion 11 of the lens holder 5, heat generated in the coil 41 hardly transfers to the first OBL 31. Heat generated in the coil 41 when energized as a result of current flowing therethrough transfers from the coil 41 to the coil fitting portion 11 of the lens holder 5. Since the first heat transfer cutoff aperture 14a is disposed between the coil fitting portion 11 convexly formed on the side surface portion 5e of the body 5b of the lens holder 5 and the first lens fitting portion 13a concavely formed on the upper portion 5c of the body 5b of the lens holder 5, it is prevented that most of heat may be transferred from the coil fitting portion 11 of the lens holder 5 to the first lens fitting portion 13a of the lens holder 5. Thus, thermal effects on the first OBL 31 is suppressed.

Between the second lens fitting portion 13b and the coil fitting portion 12 is disposed a second heat transfer cutoff aperture 14b that prevents heat generated in the coil 42 from being transferred to the second OBL 32. The heat dissipating gap 14b lies between the body 5b of the lens holder 5 and the coil fitting portion 12. The heat transfer cutoff aperture 14b is disposed in the lens holder 5 to cut off a path of heat.

This facilitates the prevention of the transfer of heat generated in the coil 42 to the second OBL 32. By virtue of the second heat transfer cutoff aperture 14b disposed between the second lens fitting portion 13b of the lens holder 5 and the coil fitting portion 12 of the lens holder 5, heat generated in the coil 42 hardly transfers to the second OBL 32. Heat generated in the coil 42 when energized as a result of current flowing therethrough transfers from the coil 42 to the coil fitting portion 12 of the lens holder 5. Since the second heat transfer cutoff aperture 14b is disposed between the coil fitting portion 12 convexly formed on the side surface portion 5e of the body 5b of the lens holder 5 and the second lens fitting portion 13b concavely formed on the upper portion 5c of the body 5b of the lens holder 5, it is prevented that most of heat may be transferred from the coil fitting portion 12 of the lens holder 5 to the second lens fitting portion 13b of the lens holder 5. Thus, thermal effects on the second OBL 32 is suppressed.

The heat transfer improving reinforcement member 50 (FIG. 1) is formed by punching a metal plate of a nonferrous metal material superior in heat conduction properties and heat radiation properties. The first piece 10 and the second piece 20 making up the lens holder 5 are formed from a synthetic resin material reducing the weight of the lens holder 5 and having an excellent moldability, using injection molding superior in mass production capabilities.

This prevents uneven temperature gradients from occurring in each of the OBLs 31 and 32. By mating and fitting the nonferrous metal heat transfer improving reinforcement member 50 with and on the lens holder 5 configured with the synthetic resin first piece 10 and second piece 20 in assembled relation, flow of heat originating from the coils 41, 42, 43, 44, 45, and 46 becomes uniform. Thus, heat generated in the coils 41, 42, 43, 44, 45, and 46 is transferred via the lens holder 5 substantially uniformly to the OBLs 31 and 32.

Since in general the nonferrous metals are resistant to corrosion, the nonferrous metal heat transfer improving reinforcement member 50 is mounted on the OPU 1 having a rising temperature without developing its corrosion over a long period of time. The nonferrous metals can be, e.g., aluminum or magnesium. Nonferrous metal alloys can be, e.g., aluminum alloys or magnesium alloys. To be concrete, the nonferrous metal materials such as aluminum alloys can be, e.g., nonferrous metal materials containing about 0.01% to 0.6% of performance improving components such as magnesium (Mg), manganese (Mn), etc.

Since in general the metal material molded part has a rigidity higher than that of the resin material molded part, an improved rigidity is imparted to the lens holder assembly 6 configured by mating and fitting the nonferrous heat transfer improving reinforcement member 50 with and on the synthetic resin holder 5. The improved rigidity of the lens holder assembly 6 prevents the occurrence of the higher-order resonance that the lens holder assembly 6 provided with the OBLs 31 and 32 may vibrate remarkably upon seeking of the OPU 1 for example. Thus, the OPU 1 is configured that allows for the higher-order resonance and that is easy to control.

The heat transfer improving reinforcement member 50 (FIG. 1) is formed as a non-magnetic member not affected by magnetic forces arising at all times from magnetic materials such as the magnets 61, 62, 63, 64, 65, and 66 (FIGS. 4 and 5) and electromagnetic forces generated in the coils 41, 42, 43, 44, 45, and 46 (FIGS. 1 to 4) when energized as a result of current flowing therethrough.

In order to prevent a short circuit from occurring as a result of a contact of the metal coils 41, 42, 43, 44, 45, and 46 with the metal heat transfer improving reinforcement member 50, the metal coils 41, 42, 43, 44, 45, and 46 fitted on the lens holder 5 are spaced apart from and in non-contact with the metal heat transfer improving reinforcement member 50 (FIG. 3). In order to insulate current flowing through the coils 41, 42, 43, 44, 45, and 46 from the metal heat transfer improving reinforcement member 50, the lens holder 5 is formed of a synthetic resin material having excellent insulating properties.

The lens holder 5 fitted with the coils 41, 42, 43, 44, 44, 45, and 46 is formed of a synthetic resin material having excellent insulating properties. The lens holder 5 is formed of a synthetic resin material having a less specific gravity than the metal materials and suited for the weight reduction. Detailedly, the lens holder 5 is formed from a thermoplastic resin such as a liquid crystal polymer having an excellent moldability, based on the injection molding superior in mass production capabilities. The liquid crystal polymer can be, e.g., VECTRA (registered trademark), etc., manufactured by Polyplastic Co. Products of VECTRA can be, e.g., grade A410, S471, etc.

The heat transfer improving reinforcement member 50 (FIG. 1) is formed by punching a metal plate of an aluminum material such as an aluminum alloy into a substantially flat plate with lightening portions. The heat transfer improving reinforcement member 50 is formed as an aluminum plate.

By forming the heat transfer improving reinforcement member 50 from the aluminum material, uneven temperature gradients are prevented from occurring in the OBLs 31 and 32 (FIGS. 1 to 3). The aluminum material molded part has excellent heat conduction properties, that is, the aluminum material molded part excels in heat conduction. The thermal conductivity of the aluminum material molded part is about three times that of the iron material molded part. For example, the thermal conductivity of the iron material molded part is about 47 kcal/m·hr·° C., whereas the thermal conductivity of the aluminum material molded part is about 180 kcal/m·hr·° C. In this manner, the aluminum material molded part conducts heat easily. Thus, heat generated in the coils 41, 42, 43, 44, 45, and 46 when the coils 41, 42, 43, 44, 45, and 46 are energized as a result of current flowing through the coils 41, 42, 43, 44, 45, and 46 is effectively transferred to the aluminum heat transfer improving reinforcement member 50 to be radiated therefrom.

When the coils 41, 42, 43, 44, 45, and 46 generate heat at the same time with current supplied to the coils 41, 42, 43, 44, 45, and 46 at the same time, the heat transfer improving reinforcement member 50 of the nonferrous metal such as aluminum is first warmed up. Afterward, heat rises up from the lower portion 5d of the lens holder 5 toward the upper portion 5c thereof to be transferred substantially uniformly to the OBLs 31 and 32.

The aluminum material molded part has a high specific rigidity. Since in general the molded part of an aluminum material such as an aluminum alloy has a higher rigidity than the synthetic resin material molded part, the rigidity of the lens holder assembly 6 is improved that is configured by mating and fitting the aluminum heat transfer improving reinforcement member 50 with and on the synthetic resin lens holder 5. The improved rigidity of the lens holder assembly 6 prevents the occurrence of the higher-order resonance that the lens holder assembly 6 provided with the OBLs 31 and 32 vibrates remarkably when the OPU 1 seeks for example. Thus, the OPU 1 is configured that allows for the higher-order resonance and that is easy to control.

The aluminum material molded part is suited for weight reduction. For example, the specific gravity of aluminum is about one third that of iron. For example, the specific gravity of iron is about 7.87, whereas that of aluminum is about 2.71. The weight reduction of the OPU 1 is achieved by forming the substantially flat plate-like heat transfer improving reinforcement member 50 with lightening portions by punching a metal plate of an aluminum material. In spite of the heat transfer improving reinforcement member 50 being mounted on the lens holder 5, the operating performance responsivity of the lens holder 5 is prevented from being lowered.

The aluminum material molded part is a non-magnetic part free from magnetization and not affected by the magnetic field. This prevents the aluminum heat transfer improving reinforcement member 50 from magnetically affecting the coils 41, 42, 43, 44, 45, and 46 and the magnets 61, 62, 63, 64, 65, and 66. Thus, the OPU 1 is configured that no adverse effects are exerted magnetically on the plurality of coils 41, 42, 43, 44, 45, and 46 capable of driving the lens holder 5, and on the plurality of magnets 61, 62, 63, 64, 65, and 66.

It is preferred to use, as the nonferrous metal material whose main component is aluminum, an aluminum alloy containing about 0.05% to 0.6% of at least one performance improving component selected from a group consisting of magnesium (Mg) and manganese (Mn) for example.

The nonferrous metal material having aluminum as its main component can be, e.g., an aluminum-magnesium (Al—Mg) type alloy that is superior in workability and corrosion resistance. More specifically, the nonferrous metal material having aluminum as its main component can be, e.g., a 5000 series material defined based on "JIS H4000". To be concrete, the aluminum alloy can be e.g., 5005 (A5005), 5052 (A5052), 5056 (A5056), 5083 (A5083), or 5086 (A5086) defined based on "JIS H4000".

The nonferrous metal material having aluminum as its main component can be, e.g., an aluminum-manganese (Al—Mn) type alloy that is superior in workability and corrosion resistance. More specifically, the nonferrous metal material having aluminum as its main component can be, e.g., a 3000 series material defined based on "JIS H4000". To be concrete, the aluminum alloy can be e.g., 3003 (A3003), 3004 (A3004), or 3005 (A3005) defined based on "JIS H4000".

Depending on the design/specifications of the optical pickup unit 1, the heat transfer improving reinforcement member 50 whose main component is aluminum may be replaced by the heat transfer improving reinforcement member 50 whose component is a nonferrous metal other than aluminum. For example, in place of the heat transfer improving reinforcement member 50 whose main component is aluminum, the heat transfer improving reinforcement member 50 having copper as its main component was used. The heat transfer improving reinforcement member 50 made mainly of copper serves as a balancer. Since copper is a heavy material with a specific gravity of about 8.92, the balance is kept of the lens holder 5 fitted with the two OBLs 31 and 32 on the upper portion 5c of the body 5b of the lens holder 51, by fitting the heat transfer improving member 50 whose main component is copper onto the lower portion 5d of the lens holder 5 fitted with the two OBLs 31 and 32.

The heat transfer improving reinforcement member 50 used in lieu of the aluminum heat transfer improving reinforcement member 50 is formed by punching a metal plate of a copper material such as a copper alloy into a substantially flat plate with lightening portions. The heat transfer improving reinforcement member 50 is formed as a copper plate.

By forming the heat transfer improving reinforcement member 50 from the copper material, it is prevented that uneven temperature gradients may occur in the OBLs 31 and 32. The copper material molded part has excellent heat conduction properties. For example, the thermal conductivity of a pure copper material molded part is at least six times that of the iron material molded part. For example, the thermal conductivity of the iron material molded part is about 0.150 cal/cm·/sec/° C., whereas that of the pure copper material molded part is about 0.938 cal/cm·/sec/° C. For example, the thermal conductivity of the copper material molded part is at least about 1.5 times that of the aluminum material molded part. The thermal conductivity of the aluminum material molded part is about 0.534 cal/cm·/sec/° C., whereas that of the pure copper material molded part is about 0.938 cal/cm·/sec/° C. In this manner, the copper material molded part conducts heat easily. Thus, heat generated in the coils 41, 42, 43, 44, 45, and 46 when the coils 41, 42, 43, 44, 45, and 46 are energized as a result of current flowing through the coils 41, 42, 43, 44, 45, and 46 is effectively transferred to the copper heat transfer improving reinforcement member 50 to be radiated therefrom.

When the coils 41, 42, 43, 44, 45, and 46 generate heat at the same time with current supplied to the coils 41, 42, 43, 44, 45, and 46 at the same time, the heat transfer improving reinforcement member 50 of the nonferrous metal such as copper is first warmed up. Afterward, heat rises up from the lower portion 5d of the lens holder 5 toward the upper portion 5c thereof to be transferred substantially uniformly to the OBLs 31 and 32.

The molded part of a copper material selected from various types of copper materials for use in the optical pickup unit 1 is a non-magnetic part free from magnetization and not affected by the magnetic field. This prevents the copper heat transfer improving reinforcement member 50 from magnetically affecting the coils 41, 42, 43, 44, 45, and 46 and the magnets 61, 62, 63, 64, 65, and 66. Thus, the OPU 1 is configured that no adverse effects are exerted magnetically on the plurality of coils 41, 42, 43, 44, 45, and 46 capable of driving the lens holder 5, and on the plurality of magnets 61, 62, 63, 64, 65, and 66.

The nonferrous metal material whose main component is copper can be, e.g., a tough pitch copper that is superior in workability and anticorrosion. The tough pitch copper can be, e.g., C1100, etc., defined based on "JIS H3100". The nonferrous metal material having copper as its main component can be, e.g., an oxygen free copper that is superior in workability and corrosion resistance. The oxygen free copper can be, e.g., C1020, etc., defined based on "JIS H3100". The nonferrous metal material made mainly of copper can be, e.g., a phosphorous-deoxidized copper that is superior in workability and anticorrosion. The phosphorous-deoxidized copper can be, e.g., C1201, etc., defined based on "JIS H3100".

The heat transfer improving reinforcement member 50 is provided with a pair of gate trace preventing portions 52, 52 in the shape of through-holes that prevent a pair of injection gate trace portions not shown of the lens holder 5 from interfering with the heat transfer improving reinforcement member 50. The pair of through-hole-shaped gate trace preventing portions 52, 52 disposed in the heat transfer improving reinforcement member 50 serves also as the lightening portions for reducing the weight of the heat transfer improving reinforcement member 50.

As shown in FIG. 3, the aluminum alloy heat transfer improving reinforcement member 50 is fitted on the lens holder 5 such that the member 50 abuts against walls 5g and 5h making up the synthetic resin lens holder 5 (i.e., the walls 5g and 5h are constituents of the synthetic resin lens holder 5).

This allows heat originating from the coils 41, 42, 43, 44, 45, and 46 fitted on the lens holder 5 to be transferred via the walls 5g and 5h of the lens holder 5 to the heat transfer improving reinforcement member 50. More specifically, heat arising from the coils 41 and 42 fitted on the lens holder 5 is securely transferred via the wall 5g of the lens holder 5 to the heat transfer improving reinforcement member 50. Heat arising from the coils 43, 44, 45, and 46 fitted on the lens holder 5 is securely transferred via the wall 5h of the lens holder 5 to the heat transfer improving reinforcement member 50.

Since the heat transfer improving reinforcement member 50 abuts against the walls 5g and 5h making up the lens holder 5, heat is prevented from accumulating in the lens holder 5. Heat originating from the coils 41 and 42 are transferred to the heat transfer improving reinforcement member 50 abutting against the wall 5g of the lens holder 5 to be effectively radiated from the heat transfer improving reinforcement member 50. Heat originating from the coils 43, 44, 45, and 46 are transferred to the heat transfer improving reinforcement member 50 abutting against the wall 5h of the lens holder 5 to be effectively radiated from the heat transfer improving reinforcement member 50.

Using an adhesive not shown, the heat transfer improving reinforcement member 50 is secured to the lower portion 5d of the lens holder 5. The adhesive used was an adhesive containing a thermoset resin. More specifically, use was made of an epoxy resin that is the thermoset resin as the adhesive for fixing the heat transfer improving reinforcement member 50 to the lens holder 5. To be concrete, used as the adhesive was e.g., an ultraviolet curable adhesive of the epoxy type that becomes cured by irradiating with ultraviolet rays. Depending on the design/specifications of the optical pickup unit 1, an ordinary epoxy adhesive for example may be used instead of the ultraviolet curable adhesive.

The heat transfer improving reinforcement member 50 is provided with a pair of positioning apertures 58, 58 (FIG. 1) for facilitating the positioning relative to the lens holder 5 (FIG. 3). The pair of positioning apertures 58, 58 disposed in the heat transfer improving reinforcement member 50 serves also as lightening portions for reducing the weight of the heat transfer improving reinforcement member 50. The lens holder 5 (FIG. 3) is provided with a pair of positioning protuberances 28, 28 corresponding to the pair of positioning apertures 58, 58 disposed in the heat transfer improving reinforcement member 50.

By engaging the pair of positioning apertures 58, 58 of the heat transfer improving reinforcement member 50 with the pair of positioning protuberances 28, 28 of the lens holder 5, the heat transfer improving reinforcement member 50 is mounted on the lens holder 5 with high accuracy.

The heat transfer improving reinforcement member 50 is provided with a pair of positioning protrusive end edges 59, 59 (FIG. 1) for facilitating the positioning relative to the lens holder 5 (FIG. 3) and defining the direction of fitting of the heat transfer improving reinforcement member 50 relative to the lens holder 5. The lens holder 5 (FIG. 3) has a pair of positioning bulged inner walls 29, 29 corresponding to the pair of positioning protrusive end edges 59, 59 disposed on the heat transfer improving reinforcement member 50.

By engaging the pair of positioning protrusive end edges 59, 59 of the heat transfer improving reinforcement member 50 with the pair of positioning bulged inner walls 29, 29 of the lens holder 5, the heat transfer improving reinforcement member 50 is mounted on the lens holder 5 with high accuracy and in a correct direction.

Heat of the lens holder 5 is radiated via the heat transfer improving reinforcement member 50 mounted accurately on the lens holder 5 to the exterior of the lens holder assembly 6. Thus, the thermal conductivity of the whole lens holder assembly 6 is improved.

As shown in FIG. 1, the lens holder 5 is configured to include the first piece 10 mounted with the plurality of OBLs 31 and 32, and the second piece 20 mounted with the heat transfer improving reinforcement member 50.

This suppresses the amount of heat transferred to the OBLs 31 and 32. By dividing the lens holder 5 into two pieces, i.e., the first piece 10 mounted with the plurality of OBLs 31 and 32 and the second piece 20 mounted with the heat transfer improving reinforcement member 50, heat transfer from the second piece 20 toward the first piece 10 becomes indirect. Due to the indirect heat transfer from the second piece 20 toward the first piece 10, a suppressed amount of heat is transferred to the first piece 10 mounted with the OBLs 31 and 32. The suppressed amount of heat transferred to the first piece 10 leads to a suppressed amount of heat to the OBLs 31 and 32 mounted on the first piece 10. Irrespective of the complex shape of the lens holder 5, the lens holder 5 is easily fabricated based on the injection molding by dividing the lens holder 5 into two pieces, i.e., the first piece 10 and the second piece 20 mated with the first piece 10.

Although the lens holder 5 is configured to be of a two-piece structure having the first piece 10 and the second piece 20 in FIGS. 1 to 3, a one-piece lens holder (5) may be employed instead of the two-piece lens holder 5, depending on the design/specifications of the OPU 1.

As shown in FIG. 1, the lens holder 5 is configured to include the first piece 10 fitted with the first OBL 31 and the second OBL 32 and the second piece 20 fitting with the single heat transfer improving reinforcement member 50. The thermal conductivity of a material forming the first piece 10 is different from that of a material forming the second piece 20.

This suppresses the amount of heat transferred to the first OBL 31 and the second OBL 32. Since the thermal conductivity of the material forming the first piece 10 is different from that of the material forming the second piece 20, a suppressed amount of heat is transferred to the first piece 10 mounted with the first OBL 31 and the second OBL 32. For example, the material of the first piece 10 and the material of the second piece 20 may properly be selected so as to suppress the amount of heat transfer delivered to the first piece 10 fitted with the OBLs 31 and 32.

The lens holder 5 (FIG. 1) is configured to include the first piece 10 fitted with the couple of OBLs 31 and 32 and the second piece 20 fitted with the single heat transfer improving reinforcement member 50.

The coils 41, 42, 43, 44, 45, and 46 used were the pair of first-direction driving coils 41 and 42 mounted on the first piece 10 and the two pairs of second-direction driving coils 43, 44, 45, and 46 mounted on the second piece 20.

The first-direction driving coils 41 and 42 driving the lens assembly 7 along the first direction D1 are tracking coils driving the lens assembly 7 along the tracking direction. "Tracking" means locating a spirally described track by tracking and observing minute pits (holes or recesses), grooves, wobbles, etc., disposed on the optical disc using light (all not shown). When a tracking servo of the lens assembly 7 fitted with the OBLs 31 and 32 is provided for the optical disc, the lens assembly 7 fitted with the OBLs 31 and 32 is moved in the front-to-rear direction D1.

The second-direction driving coils 43, 44, 45, and 46 driving the lens assembly 7 along the second direction D2 are focus/tilt coils driving the lens assembly 7 relative to the optical disc along the focus direction or performing tilt adjustment of the lens assembly 7. "Focus" means a focal point or focusing. "Tilt" means deviation between the signal surface of the optical disc and the optical axis of laser light issued from the light emitting element and passing through the OBL. When a focus servo of the lens assembly 7 fitted with the OBLs 31 and 32 is provided for the optical disc, the lens assembly 7 fitted with the OBLs 31 and 32 is moved in the top-to-bottom direction D2.

The coil fitting portion 11 wound with the coil 41 protrudes from the side surface portion 5e of the first piece 10. The coil fitting portion 12 wound with the coil 42 protrudes from the side surface portion 5e of the first piece 10. The side surface portion 5e of the first piece 10 is provided with the first coil fitting portions 11 and 12 in a pair wound with the first-direction driving coils 41 and 42, respectively.

The coil fitting portion 23 wound with the coil 43 protrudes from the frame portion 5f of the second piece 20. The coil fitting portion 24 wound with the coil 44 protrudes from the frame portion 5f of the second piece 20. The coil fitting portion 25 wound with the coil 45 protrudes from the frame portion 5f of the second piece 20. The coil fitting portion 26 wound with the coil 46 protrudes from the frame portion 5f of the second piece 20. The frame portion 5f of the second piece 20 is provided with the second coil fitting portions 23, 24, 25, and 26 in two pairs wound with the second-direction driving coils 43, 44, 45, and 46, respectively.

Thus, the OPU 1 is configured that takes for heat measures and that has a suppressed price. For example, using the lens holder of a structure in which coils (41, 42, 43, 44, 45, and 45) are wound around and across the first piece and second piece, both of the pieces being constituents of the lens holder (5), it was a difficult work to effectively and correctly wind the coils (41, 42, 43, 44, 45, and 46) around and across the first piece and the second piece. A difficult coil winding work may result in a lot of time taken for the coil winding work and hence in a rise in the price of the OPU (1).

However, effective and correct coil winding work is ensured by winding the first-direction driving coils 41 and 42 around the first coil fitting portions 11 and 12 of the first piece 10 and by winding the second-direction driving coils 43, 44, 45, and 46 around the second coil fitting portions 23, 24, 25, and 26 of the second piece 20. Since the coil winding work is composed of two separate winding works, i.e., the work of winding the first-direction driving coils 41 and 42 around the first coil fitting portions 11 and 12, respectively, of the first piece 10 of the lens holder 5 and the work of winding the second-direction driving coils 43, 44, 45, and 46 around the second coil fitting portions 23, 24, 25, and 26, respectively, of the second piece 20 of the lens holder 5, the coil winding work is performed without any trouble and effectively. Thus, the OPU 1 has a reduced manufacturing cost.

The coils 41, 42, 43, 44, 45, and 46 are formed by directly winding electric wires such as conductor wires around the coil fitting portions 11, 12, 23, 24, 25, and 26 of the lens holder 5. The coils 41, 42, 43, 44, 45, and 46 formed by winding the electric wires such as conductor wires are configured as two-layer winding type coils 41, 42, 43, 44, 45, and 46.

When the OPU 1 is assembled, the OPU 1 has on its top side a covering plate 100 for protecting various components for example. The covering plate 100 is formed by press molding e.g., a thin metal plate superior in heat radiation properties. The OPU 1 may have on its top side a black covering plate 100 of a synthetic resin for example, in place of the covering plate 100 made of the thin metal plate.

The OPU 1 is housed in an optical disc apparatus. The optical disc apparatus includes the OPU 1.

This prevents the occurrence of deficiency that aberrations may arise on a spot of laser light focused by the OBL 31 or the OBL 32 to be applied to an optical disc, and that, as a consequence, malfunctions of the optical disc apparatus may occur. The OPU of the present invention is not intended to be limited to the one shown.

For example, a substantially flat plate-shaped aluminum heat transfer improving reinforcement member (50) may be disposed immediately below the OBLs (31 and 32). The substantially flat plate-shaped aluminum heat transfer improving reinforcement member (50) may be disposed between the first piece (10) and the second piece (20) making up the lens holder (5). The substantially flat plate-shaped aluminum heat transfer improving reinforcement member (50) may be formed so as to surround the OBLs (31 and 32).

By optimizing the position to fit the aluminum heat transfer improving reinforcement member 50 on the lens holder 5 or by optimizing the shape of the aluminum heat transfer improving reinforcement member 50, is carried out the position adjustment of the center of gravity of the moving part 3 of the OPU 1 or the improvement in the higher-order resonance characteristics.

Although the OPU 1 of FIG. 4 has the lens holder 5 fitted with the two OBLs 31 and 32, i.e., the first OBL 31 and the second OBL 32, the OPU is also available (not show) that has a lens holder fitted with only one OBL without being fitting with the two OBLs (31 and 32), depending on the design/specifications of the OPU 1, for example.

The light emitting element emitting laser light may be e.g., a dual-wavelength light emitting element not shown capable of emitting laser lights of two different wavelengths or a triple-wavelength light emitting element not shown capable of emitting laser lights of three different wavelengths.

Although the embodiments of the present invention have hereinabove been described, the above embodiments are merely for facilitating the understanding of the present invention and are not in any way to be construed as limiting the present invention. The present invention may variously be changed or altered without departing from its spirit and encompasses equivalents thereof.

What is claimed is:

1. An optical pickup unit comprising:
    an objective lens that focuses laser light on an optical disc;
    a lens holder that holds the objective lens;
    a coil that is fitted on the lens holder and capable of driving the lens holder; and
    a reinforcement member that is fitted on the lens holder and reinforces strength of the lens holder, wherein:
        the lens holder is formed substantially in a shape of a box having an opening,
        the reinforcement member is formed substantially in a plate shape corresponding to the opening, and
        a lens holder assembly is configured such that the reinforcement member is fitted in the opening.

2. The optical pickup unit of claim 1, wherein
    the reinforcement member is formed from a non-magnetic material.

3. The optical pickup unit of claim 1, the lens holder comprising:
a first piece on which the objective lens is fitted; and
a second piece on which the reinforcement member is fitted,
wherein the first piece and the second piece are formed at substantially opposite sides of the lens holder, respectively.

4. An optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder,
wherein the objective lens further comprises:
a first objective lens for a first-wavelength laser light; and
a second objective lens for a second-wavelength laser light having a wavelength different from that of the first-wavelength laser light, and
wherein the lens holder further comprises:
a lens fitting portion on which the first objective lens and the second objective lens are fitted; and
a member fitting portion on which the reinforcement member is fitted, and wherein the lens fitting portion and the member fitting portion are formed at substantially opposite sides of the lens holder, respectively, and
wherein a lens assembly is configured such that the first objective lens and the second objective lens are fitted on the lens fitting portion and such that the reinforcement member is fitted on the member fitting portion.

5. An optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder, wherein the reinforcement member is provided with a lightening portion configured to reduce weight of the reinforcement member.

6. The optical pickup unit of claim 1, wherein the reinforcement member is formed with a laser light passing hole that allows the laser light to pass therethrough.

7. The optical pickup unit of claim 1, wherein the reinforcement member is provided with a positioning protrusive end edge and the lens holder is provided with a positioning bulged inner wall corresponding to the positioning protrusive end edge.

8. The optical pickup unit of claim 1, wherein the reinforcement member abuts against a wall which is a constituent of the lens holder.

9. An optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder, the lens holder further comprising:
a first piece on which the objective lens is fitted; and
a second piece on which the reinforcement member is fitted,
wherein a thermal conductivity of a material forming the first piece is different from that of a material forming the second piece.

10. An optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder,
the lens holder further comprising:
a first piece on which the objective lens is fitted; and
a second piece on which the reinforcement member is fitted; and
the coil further comprising:
a first-direction driving coil fitted on the first piece; and
a second-direction driving coil fitted on the second piece;
wherein the first piece is provided with a first coil fitting portion around which the first-direction driving coil is wound, and the second piece is provided with a second coil fitting portion around which the second-direction driving coil is wound.

11. The optical pickup unit of claim 1, wherein the reinforcement member is secured to the lens holder with an adhesive.

12. The optical pickup unit of claim 11, wherein the adhesive includes a one-part adhesive.

13. The optical pickup unit of claim 11, wherein the adhesive includes an electron beam curable adhesive.

14. The optical pickup unit of claim 11, wherein the adhesive includes an adhesive containing a thermoset resin.

15. The optical pickup unit of claim 11, wherein the adhesive includes an epoxy resin.

16. The optical pickup unit of claim 11, wherein the adhesive includes an acrylic resin.

17. An optical disc apparatus comprising:
an optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder, wherein:
the lens holder is formed substantially in a shape of a box having an opening,
the reinforcement member is formed substantially in a plate shape corresponding to the opening, and
a lens holder assembly is configured such that the reinforcement member is fitted in the opening.

18. An optical disc apparatus comprising:
an optical pickup unit comprising:
an objective lens that focuses laser light on an optical disc;
a lens holder that holds the objective lens;
a coil that is fitted on the lens holder and capable of driving the lens holder; and
a reinforcement member that is fitted on the lens holder and reinforces strength of the lens holder, wherein the objective lens further comprises:
a first objective lens for a first-wavelength laser light; and
a second objective lens for a second-wavelength laser light having a wavelength different from that of the first-wavelength laser light;

wherein the lens holder further comprises:
   a lens fitting portion on which the first objective lens and the second objective lens are fitted; and
   a member fitting portion on which the reinforcement member is fitted, the lens fitting portion and the member fitting portion formed at substantially opposite sides of the lens holder, respectively, and
wherein a lens assembly is configured such that the first objective lens and the second objective lens are fitted on the lens fitting portion and such that the reinforcement member is fitted on the member fitting portion.

19. An optical disc apparatus comprising:
an optical pickup unit comprising:
   an objective lens that focuses laser light on an optical disc;
   a lens holder that holds the objective lens;
   a coil that is fitted on the lens holder and capable of driving the lens holder; and
   a reinforcement member that is fitted on the lens holder and reinforces strength of the lens holder, wherein the reinforcement member is provided with a lightening portion configured to reduce weight of the reinforcement member.

20. An optical disc apparatus comprising:
an optical pickup unit comprising:
   an objective lens that focuses laser light on an optical disc;
   a lens holder that holds the objective lens;
   a coil that is fitted on the lens holder and capable of driving the lens holder; and
   a reinforcement member that is fitted on the lens holder and reinforces strength of the lens holder, the lens holder further comprising:
      a first piece on which the objective lens is fitted; and
      a second piece on which the reinforcement member is fitted, wherein a thermal conductivity of a material forming the first piece is different from that of a material forming the second piece.

21. An optical disc apparatus comprising:
an optical pickup unit comprising:
   an objective lens that focuses laser light on an optical disc;
   a lens holder that holds the objective lens;
   a coil that is fitted on the lens holder and capable of driving the lens holder; and
   a reinforcement member that is fitted on the lens holder and reinforces strength of the lens holder,
   the lens holder further comprising:
      a first piece on which the objective lens is fitted; and
      a second piece on which the reinforcement member is fitted; and the coil further comprising:
      a first-direction driving coil fitted on the first piece; and
      a second-direction driving coil fitted on the second piece;
   wherein the first piece is provided with a first coil fitting portion around which the first-direction driving coil is wound, and the second piece is provided with a second coil fitting portion around which the second-direction driving coil is wound.

* * * * *